US007576952B2

(12) United States Patent
Maruyama et al.

(10) Patent No.: US 7,576,952 B2
(45) Date of Patent: Aug. 18, 2009

(54) MAGNETIC WRITE HEAD INCLUDING A MAGNETIC POLE PIECE HAVING A PROTRUSION

(75) Inventors: Yoji Maruyama, Saitama (JP); Tadayuki Iwakura, Kanagawa (JP); Makoto Morijiri, Kanagawa (JP); Shigekazu Ohtomo, Saitama (JP); Ichiro Ohdake, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 376 days.

(21) Appl. No.: 10/956,976

(22) Filed: Sep. 30, 2004

(65) Prior Publication Data

US 2005/0122622 A1 Jun. 9, 2005

(30) Foreign Application Priority Data

Dec. 3, 2003 (JP) ............................. 2003-404819

(51) Int. Cl.
*G11B 5/147* (2006.01)
*G11B 5/127* (2006.01)
(52) U.S. Cl. ............................ 360/125.43; 360/125.46; 360/125.49
(58) Field of Classification Search ................. 360/119, 360/120, 121, 122, 125, 126, 127, 125.43, 360/125.46, 125.49, 125.56
See application file for complete search history.

(56) References Cited

U.S. PATENT DOCUMENTS

| | | | | |
|---|---|---|---|---|
| 5,621,596 A | * | 4/1997 | Santini | 360/126 |
| 5,793,578 A | * | 8/1998 | Heim et al. | 360/126 |
| 5,805,391 A | * | 9/1998 | Chang et al. | 360/317 |
| 5,995,343 A | * | 11/1999 | Imamura | 360/126 |
| 6,111,724 A | * | 8/2000 | Santini | 360/126 |
| 6,207,466 B1 | * | 3/2001 | Kamijima | 438/3 |
| 6,282,776 B1 | * | 9/2001 | Otsuka et al. | 29/603.14 |
| 6,337,783 B1 | * | 1/2002 | Santini | 360/317 |
| 6,353,511 B1 | * | 3/2002 | Shi et al. | 360/126 |
| 6,417,990 B1 | | 7/2002 | Zhou et al. | |
| 6,487,041 B2 | * | 11/2002 | Yamanaka et al. | 360/126 |
| 6,944,938 B1 | * | 9/2005 | Crue et al. | 29/603.12 |

(Continued)

FOREIGN PATENT DOCUMENTS

JP 60218817 A * 11/1985

(Continued)

*Primary Examiner*—Brian E Miller
(74) *Attorney, Agent, or Firm*—Townsend and Townsend and Crew LLP; Rambod Nader

(57) ABSTRACT

In one embodiment, a thin-film magnetic head with a write head has a lower core member made of a soft magnetic film, a planar upper core member made of a soft magnetic film, and a coil conductor positioned between the lower and upper core members. The rear end is equipped with a magnetic body, which at least magnetically joins the lower and upper core members. A magnetic pole piece is in contact with the lower core member and positioned toward an air bearing surface, which faces a recording medium. A first nonmagnetic film is provided between a pedestal magnetic pole piece and upper core member. The write head is structured so that the first nonmagnetic film constitutes a write gap. A second nonmagnetic film is provided above or below the first nonmagnetic film. The edge of the second nonmagnetic film is retracted from the air bearing surface. The upper core member's flare point is positioned toward the air bearing surface rather than the edge of the second nonmagnetic film.

24 Claims, 8 Drawing Sheets

U.S. PATENT DOCUMENTS

| | | | |
|---|---|---|---|
| 6,965,495 B2 * | 11/2005 | Sato et al. | 360/125.42 |
| 6,987,643 B1 * | 1/2006 | Seagle | 360/125.42 |
| 7,124,498 B2 * | 10/2006 | Sato | 29/603.13 |
| 7,133,253 B1 * | 11/2006 | Seagle et al. | 360/126 |
| 7,142,391 B2 * | 11/2006 | Ohtomo et al. | 360/126 |
| 7,142,392 B2 * | 11/2006 | Ohtomo et al. | 360/126 |
| 7,310,203 B2 | 12/2007 | Yoshida et al. | |
| 2003/0021064 A1 * | 1/2003 | Ohtomo et al. | 360/126 |
| 2004/0090704 A1 * | 5/2004 | Matono et al. | 360/126 |
| 2004/0105189 A1 * | 6/2004 | Ohtomo et al. | 360/126 |

FOREIGN PATENT DOCUMENTS

| | | |
|---|---|---|
| JP | 09324243 A * | 12/1997 |
| JP | 2002-008209 | 1/2002 |
| JP | 2003-162802 | 6/2003 |

* cited by examiner

FIG. 2A
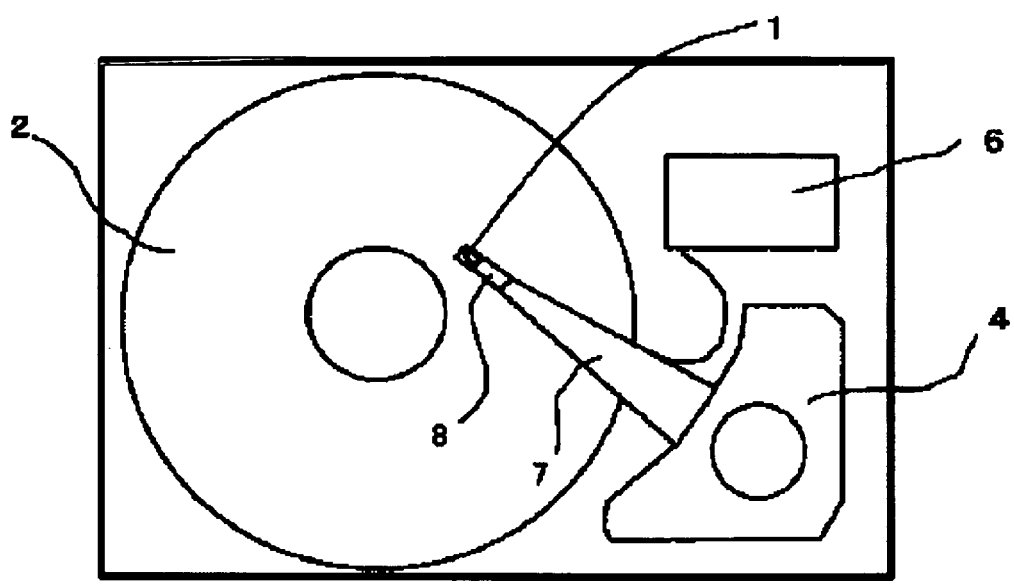
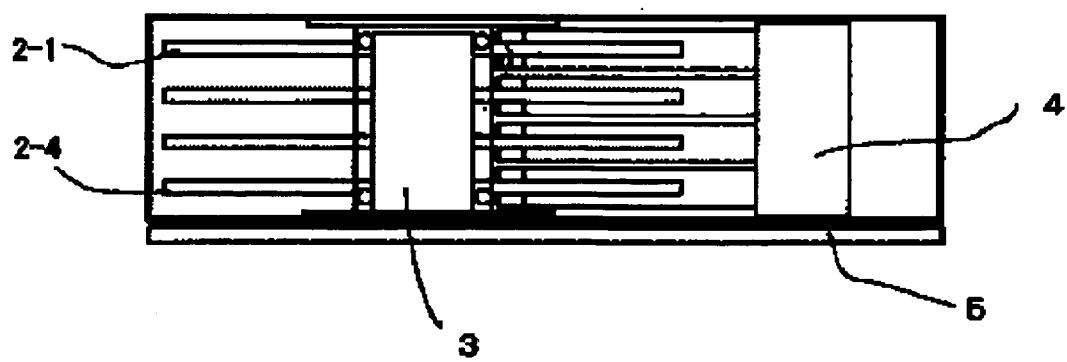
FIG. 2B (a)

(b)

(a)

(b)

(a)

(b)

(a)

(b)

MAGNETIC WRITE HEAD INCLUDING A MAGNETIC POLE PIECE HAVING A PROTRUSION

BACKGROUND OF THE INVENTION

The present invention relates to a magnetic head for use with a magnetic disk drive.

Since magnetic disk drives are high-reliability, large-capacity storage devices, they are widely used in the field of storage, which is essential to the present-day information technology society. The amount of information handled in the information technology society is strikingly increasing. As a matter of course, it is therefore demanded that the magnetic disk drives improve their performance to process a large amount of information within a short period of time.

FIG. 2 illustrates a magnetic head that is installed in a magnetic disk drive. A suspension 8 applies load as needed to press the magnetic head 1 against the surface of a recording medium 2. The suspension 8 is supported by an arm 7 and transmits the motion of a rotary actuator 4 to the magnetic head. When the rotary actuator 4 rotates, the magnetic head 1 moves over the surface of the recording medium 2, accomplishes positioning at a certain location, and then writes or reads magnetic information. In this instance, the write/read process for the magnetic head 1 is performed by a preamplifier circuit 6. The recording medium 2 is rotated by a motor 3. The electric circuitry for controlling the above operations exists together with a signal processing circuit 5.

As shown in FIG. 3, the magnetic head comprises an information write function section 10 and a read function section 11. The write function section 10 comprises a coil 12, a lower core 15, an upper core 14, a magnetic body 36, and a pedestal magnetic pole piece 28. The lower and upper cores are positioned so as to enclose the coil. The rear end of the magnetic body is magnetically coupled to these cores. The pedestal magnetic pole piece is positioned on an air bearing surface 30 (x-z plane). The track width is prescribed by the width of the upper core's protrusion through the air bearing surface 30.

A magnetic gap 29 is provided between the pedestal magnetic pole piece 28 and upper core. Magnetic field leakage from the magnetic gap is used to write magnetic information onto the recording medium.

The read function section 11 comprises a magnetoresistive device 19 and an electrode 20, which causes a constant current flow to the magnetoresistive device and detects a resistance change. An upper magnetic shield 17 and a lower magnetic shield 18 are positioned so as to enclose the magnetoresistive device 19 and electrode 20. These magnetic shields are used to shield against an unnecessary magnetic field during replay. These functionality units are formed on a magnetic head main body 25 via a nonmagnetic, insulative underlying layer 26.

The read function section illustrated in FIG. 3 is of a type that allows a sense current for detecting magnetic information to flow in a plane parallel to shields 17, 18. A read function section that incorporates both the shields and electrode has been commercialized in recent years. This new type of read function section causes a sense current flow to the magnetoresistive device in the direction of the film thickness. It is called a CPP (current perpendicular to plane) type device because its current flow is perpendicular to the film. Even when this type of device is used, no limitation is imposed on the write function section including a lower magnetic pole piece 15.

It is common in recent years that a step 31 is formed as shown in FIG. 3 by selectively etching the surface of the pedestal magnetic pole piece 28 using the upper core 14 protruding through the air bearing surface 30 as a mask. The ion milling method is generally used for step formation.

Further, a method for effectively decreasing the depth of the write gap (gap depth) by removing the rear end surface of the pedestal magnetic pole piece by means of etching (or by forming a magnetic film on the air bearing surface side) is effective in obtaining a strong magnetic field.

The basic structure of the head containing the pedestal magnetic pole piece described above is disclosed in U.S. Pat. No. 6,417,990. This structure entails a process for forming the upper core 14 in a plane after covering the rear end area including the pedestal magnetic pole piece with a nonmagnetic film. The process is employed in order to form a narrow track section with high precision when the upper core is formed later (it is obvious that a stepped part is likely to incur a resolution failure at the time of exposure).

For magnetic disk drive density increase, it is demanded that the magnetic head increase the magnetic field gradient and provide a uniform magnetic field in the direction of the recording track width. To meet such a demand, it is important that a highly saturated magnetic material be used as the magnetic pole material and that the write gap be narrowed (to decrease the distance between the lower magnetic pole piece and track-width-determining magnetic pole piece).

BRIEF SUMMARY OF THE INVENTION

The structure for stepping the rear end of the pedestal magnetic pole piece by etching (to ensure that the distance between the pedestal magnetic pole piece 28 and upper core 14 is longer on the rear end side, which is far from the air bearing surface side, than on the air bearing surface side), which is shown in FIG. 3, is capable of causing magnetic flux concentration on the air bearing surface side. Such a magnetic flux concentration effect can be used to generate a strong magnetic field from the write gap. For forming the upper core having a narrow track width, however, it is necessary to prepare a flat surface by smoothing out the stepped part with a magnetic material.

However, it is difficult to achieve perfect planarization for narrowing the write gap as needed for high-density recording. For perfect planarization, a mechanical polishing process (chemical mechanical polishing) or a back etching process based on ion milling or other dry etching method is required. These processes, however, cause a problem that is attributable to an irregular etching speed for the etching plane. Therefore, the resulting write gap thickness is not uniform. That is why the write gap cannot be narrowed.

There is another method for forming a flat surface. It first forms a stepped part on the pedestal magnetic pole piece, covers the stepped part with a nonmagnetic film, and then smoothes out the surface of the pedestal magnetic pole piece (the top of the stepped part) by performing a mechanical polishing process. However, this smoothing method still leaves an irregular surface because the amount of etching is not uniform as described above. Further, if the stepped part is tapered, the distance to the edge (distance between the air bearing surface and stepped part edge) may become nonuniform.

If the amount of stepping is irregular as described above or if a nonuniform edge position results, the magnetic field strength varies from one place to another. Thus, it is impossible to obtain a uniform magnetic field (the generated magnetic field considerably varies from one head to another).

In view of solving the aforementioned problems, embodiments of the present invention provide a magnetic head suitable for recording density enhancement by disclosing a new head structure appropriate for uniformizing magnetic field strength and increasing the precision of narrow track width.

In recent years, the CMP technology has been increasingly incorporated into a magnetic head manufacturing process to make a switchover from the conventional stitched core structure (discretely combined structure of a front end section and core section) to a one-piece planar structure disclosed by the aforementioned U.S. Pat. No. 6,417,990. The one-piece planar structure has a coil conductor that is provided between a lower core member, which comprises a soft magnetic film, and an upper planar core member, which also comprises a soft magnetic film, a rear end that is provided with a magnetic body, which at least magnetically joins the lower and upper core members, a pedestal magnetic pole piece being in contact with the lower core member at the air bearing surface side facing the recording medium, and a nonmagnetic film between the pedestal magnetic pole piece and upper core member. This nonmagnetic film forms a write gap.

To solve the above problem, in the head having the one-piece planer core structure of one embodiment of the present invention, a second nonmagnetic film is placed, particularly above, or below the nonmagnetic film to retract the edge of the second nonmagnetic film from the air bearing surface and position the flare point of the upper core member toward the air bearing surface rather than the edge of the second nonmagnetic film.

When the above structure is employed, the upper core flare point (point for narrowing the magnetic field), which has high dimensional accuracy, can be positioned on a nonmagnetic film that composes a write gap. The nonmagnetic film is a planar film that is not processed by means of CMP or etching. Therefore, there is no problem with achieving high dimensional accuracy in magnetic pole formation.

The employed structure is such that the portion rearward of the upper core flare point is positioned over the edge of the second nonmagnetic film. The portion rearward of the flare point is designed so that its width increases because of the necessity for magnetic flux collection. Therefore, there is no problem with resolution (ease of pattern formation) even when the portion rearward of the flare point is positioned over the second nonmagnetic film.

Further, embodiments of the present invention use a pedestal magnetic pole piece that is made of a high-saturation magnetic flux density material. This ensures that the step for adding a high-saturation magnetic flux density material layer can be eliminated from a subsequent process.

In marked contrast to a conventional one-piece planar head, the use of the structure described above ensures that a flat surface faces the upper core member of the pedestal magnetic pole piece.

To accurately determine the air bearing surface side width (which determines the track width) of the upper core, which needs to exhibit the highest degree of dimensional accuracy, it is necessary to flatten the surface on the pedestal magnetic core side (the upper core side surface of a nonmagnetic layer forming a write gap), which serves as the base. However, the surface of such a base is originally flat according to embodiments of the present invention. Therefore, there is no problem with magnetic pole resolution (dimensional accuracy).

Further, the employed configuration is such that the upper core member is in contact with the nonmagnetic film composing a write gap on the air bearing surface side and is positioned over the second nonmagnetic film on the rear end side of the pedestal magnetic pole piece. Since the flare point is not positioned over the second nonmagnetic film as described earlier, there is no problem with flare point resolution.

Furthermore, a protrusion having the same width as the upper core member protrusion through the air bearing surface is formed on the pedestal magnetic pole surface by selectively etching the air bearing surface side of the pedestal magnetic pole piece using the second nonmagnetic film and upper core member as a mask.

The upper core member has a flare for narrowing a magnetic flux. The point at which the magnetic flux is completely narrowed (to reduce the width) is called a flare point. The flare point according to embodiments of the present invention is positioned toward the air bearing surface side rather than the edge position of the second magnetic film, which is formed above or below the first nonmagnetic film (which forms a write gap).

When the air bearing surface side of the pedestal magnetic core is selectively etched using the second nonmagnetic film and upper core member as a mask as described above, the flare shape possessed by the upper core member and the shape of the air bearing surface side edge of the second nonmagnetic film are combined and transferred to the surface of the pedestal magnetic pole piece.

The air bearing surface position-to-flare point portion of the convex surface of the pedestal magnetic pole piece, which is formed in the above process, has the same width as the front end (track width) of the upper core member over the air bearing surface. The flare point-to-second nonmagnetic film edge portion has the same side-to-side shape as the flare of the upper core. The pedestal magnetic pole piece rearward of the edge position is shaped by means of second nonmagnetic film masking to match the edge position. The flare point of the convex surface of the pedestal magnetic pole piece may not clearly appear depending on the accuracy of the selective etching process. In other words, the width prevalent at the air bearing surface position of the convex surface of the pedestal magnetic pole piece may be the same as the upper core track width of the air bearing surface, and the width of the convex surface of the pedestal magnetic pole piece may increase with an increase in the distance from the air bearing surface so that stepwise expansion occurs in an area where the second nonmagnetic film edge is reached. In such an instance, the design flare point is determined from the upper core track width and flare shape so that the flare point is positioned between the air bearing surface and second nonmagnetic film edge.

It is anticipated that adjacent tracks may be affected by magnetic field leakage from the periphery of the upper core member, which determines the track width of the protrusion through the air bearing surface. This problem can be effectively solved by adopting a method for increasing the spatial distance between the leakage source and the leakage destination.

According to a feature of the present invention, the pedestal magnetic pole surface is etched using the second nonmagnetic film and upper core as a mask. This increases the distance between the etched pedestal magnetic pole area (leakage destination) and the upper core front end (leakage source), which is exposed above the air bearing surface, thereby reducing the magnetic leakage field.

In accordance with another feature of the present invention, a stepped part coinciding with the second nonmagnetic film edge is formed toward the air bearing surface. Since the stepped part of the pedestal magnetic pole piece is formed after upper core formation (after upper core flare point formation), it does not affect the formation of the upper core at all, unlike conventional practice. The edge of the stepped part faces the rear end, which is positioned at the rear of the upper core flare point, and is sharp (can be substantially perpendicular). Therefore, a magnetic charge is likely to concentrate at the edge of the stepped part. This effect can be used in such a manner that the magnetic flux, which is rendered unnecessary by means of reduction by upper core or partial saturation, directly flows to the pedestal magnetic pole piece. The unnecessary magnetic flux can be directly received by the stepped part of the pedestal magnetic pole piece without letting it leak out of the head air bearing surface (the stepped part becomes the direct leakage destination).

Further, the result of computer simulation has confirmed that the gradually widening convex portion, which is derived from the use of the present invention (the structure within which the flare point is positioned before the second nonmagnetic film edge), is effective in facilitating the flow of excessive magnetic flux from the upper core member.

The above features of the present invention make it possible to reduce the amount of magnetic field leakage to the air bearing surface. Thus, the present invention can implement a high-track-pitch magnetic head.

Embodiments of the present invention also provide the rear end area of the upper core member with periodic film thickness changes. When a one-piece planar core is used, its shape characteristics make it difficult to provide magnetization in the direction of the track width. For a conventional, discretely combined (stitched) head, the core having a large area is curved like a bow when viewed three-dimensionally. Because of this shape, the magnetic domains in the core are arrayed in the direction of the track width in order to reduce the demagnetizing field. However, when the core is planar, the magnetic domain array tends to be in disorder.

The magnetic domain array is important for high-frequency recording. It is particularly necessary that the magnetic domains be arrayed in the direction of the track width. For a one-piece planar core, therefore, a method, for instance, for applying a magnetic field or providing thermal treatment with a magnetic field applied is used at the time of core film formation (plating). However, the method for applying a magnetic field exerts an unignorable influence on the replay system (causing a decrease in the output and the loss of stability).

One method according to the present invention provides the upper core with periodic film thickness changes to generate a demagnetizing field within the core in a direction parallel to the direction of the track width, thereby assuring that the easy magnetization direction for the magnetic domains coincides with the direction of the track width.

The same effect can also be produced by applying periodic film thickness changes to an underlying film for the upper core member before its formation for the purpose of undulating the upper core in the direction of the film thickness.

Effectiveness is good when the above film thickness changes and undulations substantially agree with the upper core member film thickness in period. Effectiveness is verified by experiments, and it is empirically found that effectiveness is not good if the period is excessively short or long.

Embodiments of the present invention provide a minute track width with high precision, thereby implementing a magnetic head that minimizes generated magnetic field variations. Further, the structure prevents unnecessary magnetic flux leakage and provides a magnetic head that is suitable for recording density enhancement.

BRIEF DESCRIPTION OF THE DRAWINGS

FIGS. 2A and 2B are conceptual diagrams.

DETAILED DESCRIPTION OF THE INVENTION

Figures 1A, 1B:
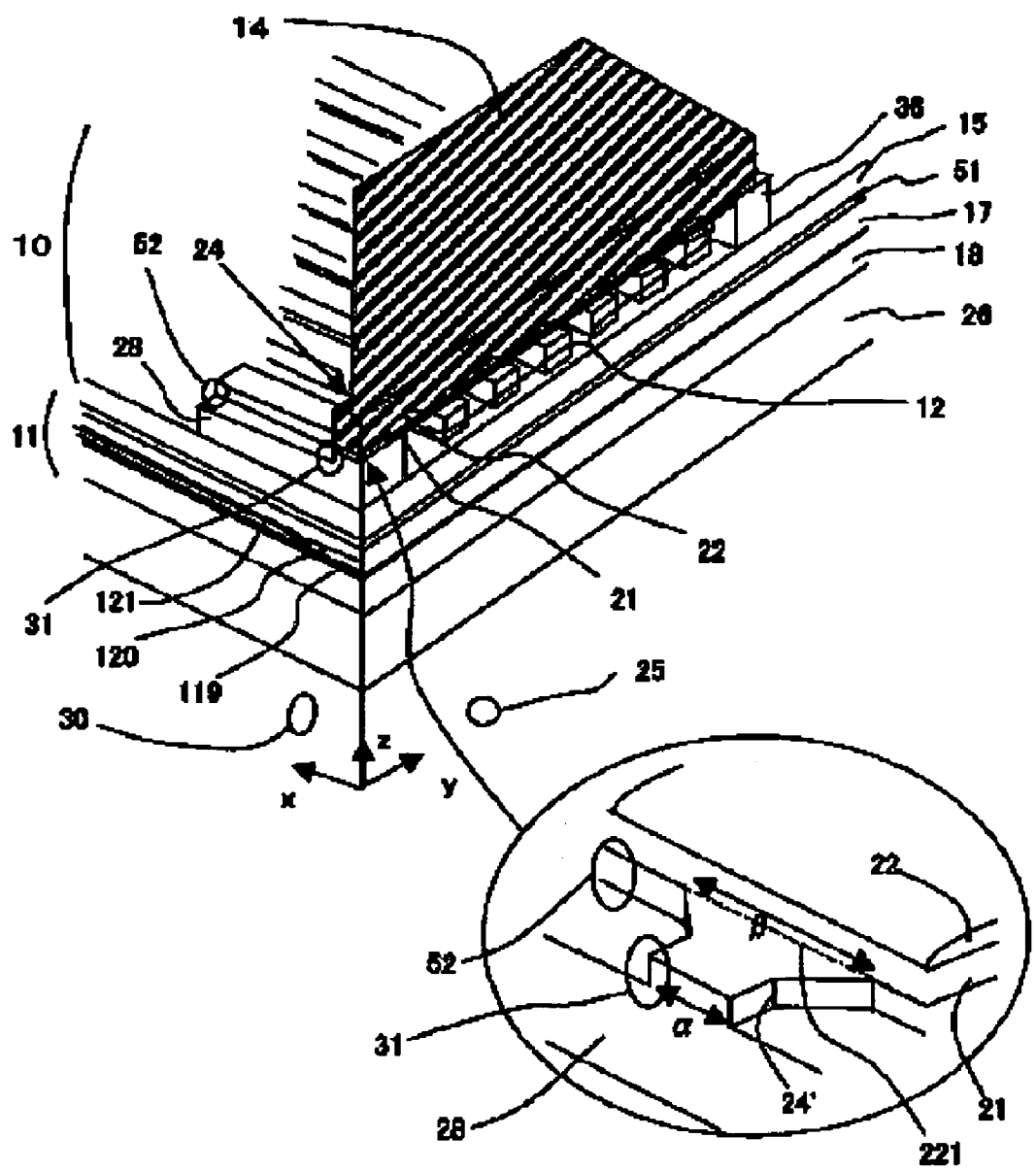
FIGS. 1A and 1B are conceptual diagrams; illustrating the cross section of a magnetic head according to an embodiment of the present invention, as well as presenting a perspective view of an air bearing surface.
Figure 3:
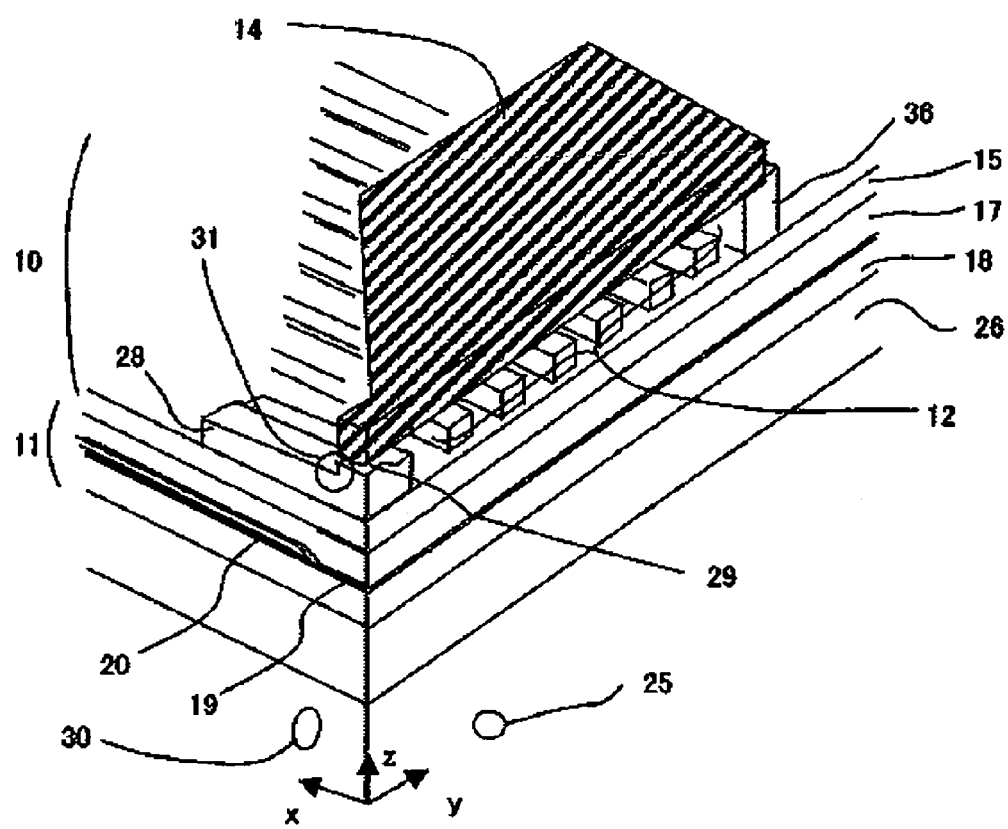
FIG. 3 illustrates a conventional magnetic head.

FIG. 1 is a conceptual diagram illustrating the cross section (section y-z) of a first embodiment of a magnetic head according to the present invention. This figure provides a perspective view of an air bearing surface (section x-z). The magnetic head comprises a substrate 25 (same as a slider member), which is made, for instance, of $Al_2O_3$—TiC, an underlying layer 26, which is positioned over the substrate and is made, for instance, of $Al_2O_3$, and a read function section 11, which is formed above the underlying layer to read information.

The read function section 11 includes an upper magnetic shield 17 and a lower magnetic field 18. In the present embodiment, the upper and lower magnetic shields 17, 18 double as current introduction electrodes for a CPP device 119. A terminal 120 is located between the CPP device 119 and the shields, which double as the electrodes. Further, a permanent magnet pattern 121 is positioned near the CPP device 119 as the magnetic domain control layer for a free layer that constitutes the CPP device 119.

The write function section 10 remains unaffected even when a giant magnetoresistive device (GMR) is used as the read function section 11 as described earlier. The present embodiment can be implemented without causing any problem even when the giant magnetoresistive device is used.

In the present embodiment, the write function section 10 is formed after a nonmagnetic film 51 is placed above the upper magnetic shield film 17. The nonmagnetic film 51 works to break the magnetic connection between a lower core 15, which forms a magnetic path at the time of a write operation, and the upper magnetic shield 17, which forms the read function section 11. As a result, the amount of output changes decreases during a reading operation.

The write function section 10 includes the lower core 15 and a track-width-determining upper core 14, which are magnetically coupled by a magnetic body pattern 36, and a coil 12, which is formed between the upper and lower cores. The upper core 14 is a planar core and provided with a flare point 24 at a specified position. Its portion between the flare point and air bearing surface is structured to have a width equal to the track width. Its rear end portion is structured like a flare. The air bearing surface side end face of the upper core 14, which determines the track width, is exposed above the air bearing surface (section x-z) of the magnetic head.

In the present embodiment of the head having the above-mentioned one-piece planar core structure, a second nonmagnetic film 22 is formed above a first nonmagnetic film 21, which especially constitutes a write gap, and the employed structure is such that the edge of the second nonmagnetic film 22 (the position closest to the air bearing surface) is positioned for retraction from the air bearing surface, and that the flare point 24 of the upper core 14 is positioned toward the air bearing surface rather than the edge.

If, on the contrary, the second nonmagnetic film 22 is placed beneath the first nonmagnetic film 21, which constitutes a write gap, and the employed structure is such that the edge of the second nonmagnetic film 22 (the position closest to the air bearing surface) is positioned for retraction from the air bearing surface, and that the flare point 24 of the upper core 14 is positioned toward the air bearing surface rather than the edge, the effect produced by the present embodiment remains unchanged.

No matter which of the above two structures is employed, the present embodiment positions the flare point of the upper core 14 toward the air bearing surface rather than the edge of the second nonmagnetic film 22. Further, the present embodiment forms a convex surface of the pedestal magnetic pole piece by etching the surface of the pedestal magnetic pole piece using the second nonmagnetic film 22 and upper core 14 as a mask.

The lower illustration in FIG. 1 shows an example of a convex surface that is formed on the pedestal magnetic pole piece 28 according to the present embodiment. The shape of the air bearing surface side of the first nonmagnetic film 21 is not shown. The convex portion of the pedestal magnetic pole piece 28 includes a rear end that remains due to masking provided by the front end on the air bearing surface side and the second nonmagnetic film 22. Stepped parts 31 and 52 are formed on the pedestal magnetic pole piece 28. These stepped parts are formed due to masking provided by the upper core 14 and second nonmagnetic film 22. The width in the direction of a track of the front end of the convex formed by stepped part 21 is equal to track width $\alpha$ on the air bearing surface side, and the width prevalent in an area that is far away from the air bearing surface and overlaps with the second nonmagnetic film edge 221 is $\beta$. Since the upper core 14 having a flare structure is used as a mask to form stepped part 31, $\alpha < \beta$. Further, shape 24', which corresponds to the flare point 24 of the upper core 14, is also formed on the convex. However, the corresponding point 24' may not always be apparently clear depending on the etching accuracy. Further, the location of the flare point 24 of the upper core 14 may not always be apparently clear. Even in such cases, the flare point 24 and corresponding point 24' according to the present embodiment can be located when the relationship between the track width $\alpha$ and flare structure of the upper core 14 is considered from the viewpoint of design. When the employed structure is such that the flare point 24 and corresponding point 24' are positioned between the head's air bearing surface and the second nonmagnetic film edge 221, the front end convex satisfies the relational expression of $\alpha < \beta$ while the rear end convex is wider that it is long. As a result, excessive magnetic flux leaking, for instance, out of the front end of the upper core 14 can be directly absorbed.

Figure 4:
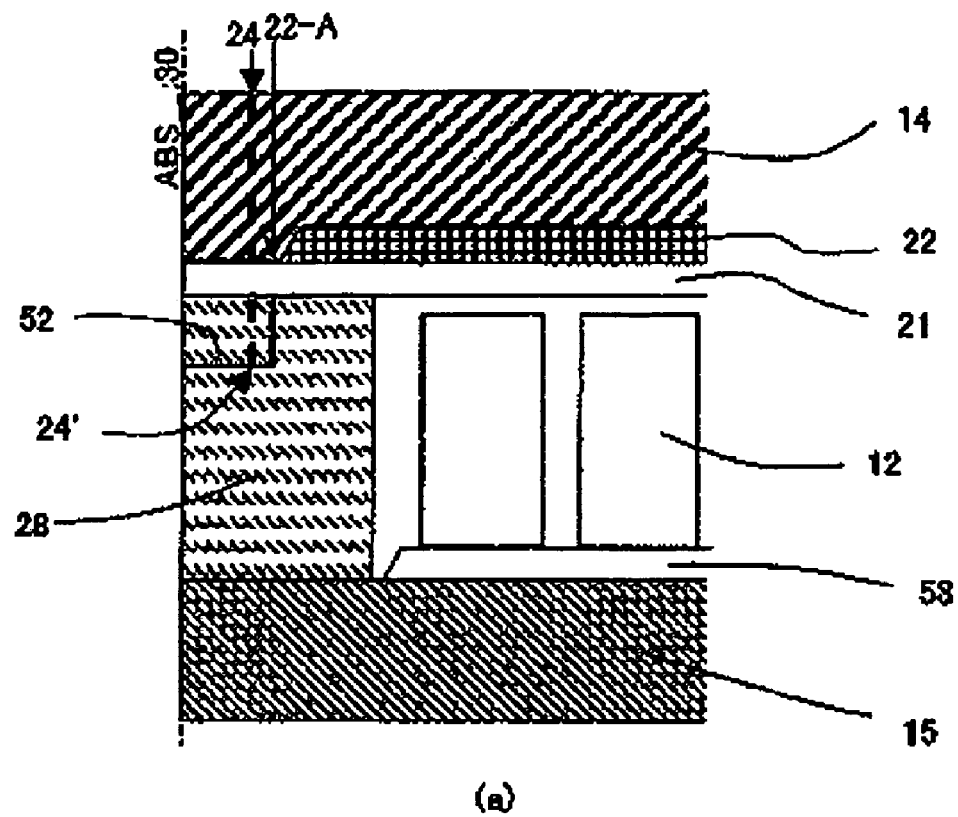
FIGS. 4A and 4B are cross-sectional views of the magnetic head according to the first embodiment of the present invention.
Figure 4:
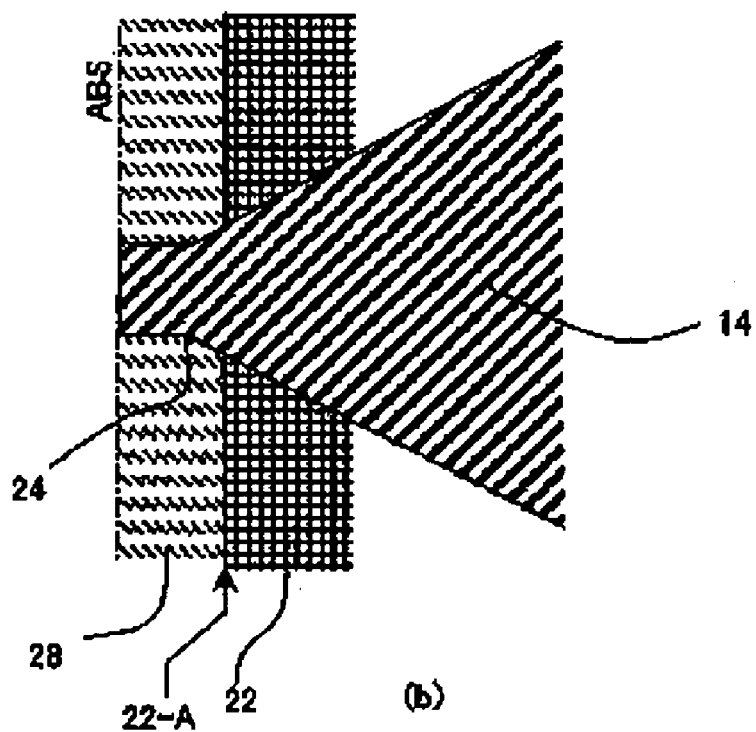

In the above configuration, the flare point 24 of the upper core 14 is positioned at a location closer to the air bearing surface (ABS surface) 30 of the second nonmagnetic film 22 than the edge 22-A, as shown in FIGS. 4A (cross section of y-z surface of a record head which is formed according to the present embodiment) and 4B (x-y plan view). The flare point 24 is capable of generating a strong magnetic field on the air bearing surface by narrowing the magnetic flux in the upper core in a direction toward the air bearing surface.

To achieve the above purpose, the width of the section for the flare point 24 needs to be highly accurate. In the present embodiment, the flare point 24 of the upper core 14 is formed and positioned above the nonmagnetic film 21, which constitutes a write gap, and the nonmagnetic film 21 is planar and not etched or subjected to a CMP process. Therefore, the present embodiment is very effective in forming the magnetic pole with high precision.

The configuration according to the present embodiment is such that the portion rearward of the flare point 24 of the upper core 14 is positioned at the second nonmagnetic film edge 22-A and placed over the second nonmagnetic film 22. However, the portion rearward of the flare point 24 is designed to be wide as described earlier. Therefore, there is no problem with resolution (ease of pattern formation) even when the portion rearward of the flare point is positioned over the second nonmagnetic film 22. However, excessive thickness would cause a problem with pattern formation. The upper limit for the thickness of the second nonmagnetic film 22, which is planar, is found to be approximately 0.3 µm (the film thickness should therefore be 0.3 µm or less). The lower limit is found to be approximately 0.1 µm because a strong magnetic field has to be obtained (the film thickness should therefore be 0.1 µm or more). If the employed film thickness is smaller than 0.1 µm, it is found that an intended write operation cannot be performed because an increased amount of magnetic flux leaks from the upper core 14 to the pedestal magnetic pole piece 28. The validity of the permissible film thickness range can easily be verified when magnetic field calculations are performed by those skilled in the art.

The pedestal magnetic pole piece 28 uses an alloy film that mainly comprises Co and Fe and exhibits a saturation magnetic flux density of about 2.4 T. Since the pedestal magnetic pole piece according to the present embodiment is made of a high-saturation magnetic flux density material, it is not necessary to add any high-saturation magnetic flux material to the write gap side. As a result, the overall process can be simplified.

In the present embodiment, the surface of the pedestal magnetic pole piece 28 is flattened (see FIGS. 4A and 4B) before the first nonmagnetic film 21 is formed. A CMP process is employed for flattening purposes. Even when the surface of the pedestal magnetic pole piece 28 is flattened, there is no problem with the resolution of the upper core 14, which has minute dimensions. The structure of the pedestal magnetic pole piece 28 for the magnetic head shown in FIGS. 4A and 4B is the same as the structure shown in the enlarged detail in FIG. 1.

In the present embodiment, the upper core 14 is in contact with only the air bearing surface side of the first nonmagnetic film 21, which constitutes a write gap, and is positioned over the second nonmagnetic film 22 on the rear end side of the pedestal magnetic pole piece 28. Since the flare point 24 is not positioned over the second nonmagnetic film 22 as described earlier, there is no problem with the resolution of the flare point 24.

Figure 6:
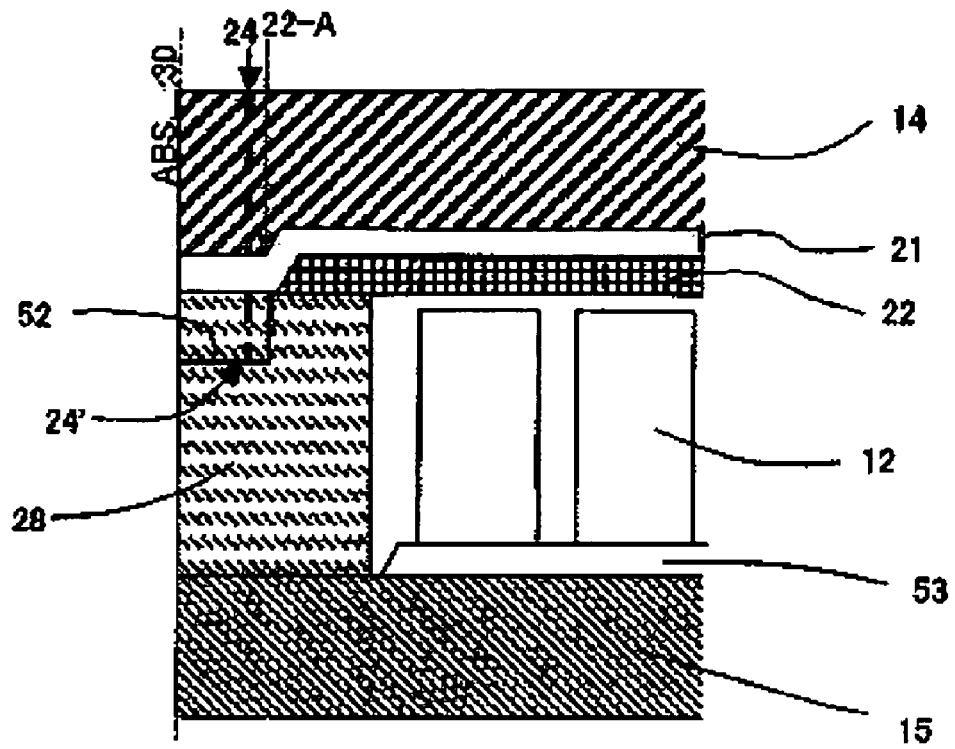
FIGS. 6A and 6B are cross-sectional views of a magnetic head according to a modified version of the first embodiment of the present invention.
Figure 6:
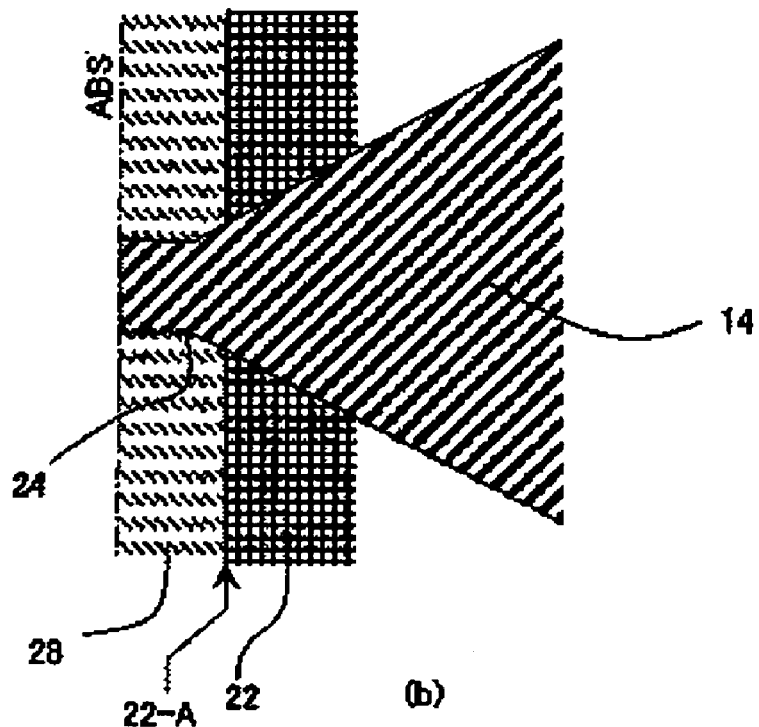
Figure 8:
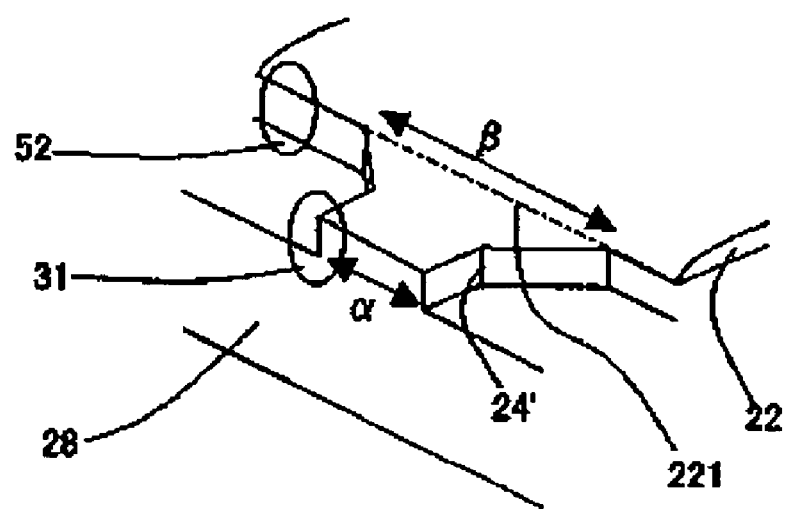
FIG. 8 is an enlarged cross-sectional view of a magnetic head according to a modified version of the first embodiment of the present invention.

As shown in FIGS. 6A and 6B, it is possible to employ a configuration so that the second nonmagnetic film 22 is positioned above the flattened pedestal magnetic pole piece 28 and that the first nonmagnetic film 21, which constitutes a write gap, is positioned above the second nonmagnetic film 22. In such an instance, the air bearing surface side edge position 22-A of the second nonmagnetic film 22 is positioned above the pedestal magnetic pole piece 28, and the second nonmagnetic film 22 is formed so that the flare point 24 is positioned toward the air bearing surface rather than the edge position 22-A. The pedestal magnetic pole piece 28 is etched to form a convex using the upper core 14 and second nonmagnetic film 22 as a mask. The convex has a front end and rear end as indicated in FIGS. 4A and 4B and is structured the same as indicated by the enlarged detail in FIG. 1. However, the difference is that the second nonmagnetic film 22 is directly formed on the rear end of the convex. FIG. 8 presents an enlarged detail that illustrates the structure of the pedestal magnetic pole piece 28 and second nonmagnetic film 22. In the present embodiment, too, the relational expression of $\alpha < \beta$ is satisfied as is the case with FIG. 1.

The configuration shown in FIGS. 6A and 6B is such that the first nonmagnetic film 21 is positioned over the second nonmagnetic film 22, and that the upper core 14 is positioned over the first nonmagnetic film 21. Even when this configuration is employed, the appropriate film thickness range for the second nonmagnetic film 22 is from about 0.1 to 0.3 µm. Further, the flare point 24 of the upper core 14 is not positioned over the first nonmagnetic film 21, which is formed above the second nonmagnetic film. Therefore, there is no problem with the resolution of the flare point.

In all the configurations shown in FIGS. 4A, 4B, 6A, and 6B, the air bearing surface side of the pedestal magnetic pole piece 28 is selectively etched (to form stepped parts 31 and 52) using the second nonmagnetic film 22 and upper core member 14 as a mask for the purpose of reducing the amount of magnetic field leakage to the pedestal magnetic pole piece 28 from the front end of the upper core 14, which is exposed above the air bearing surface 30. Due to this process, a protrusion having the same width as the width appearing on the air bearing surface of the upper core member 14 is formed on the pedestal magnetic pole surface.

The above process also makes it possible to increase the spatial distance between the second core front end (air bearing surface side), which is the leakage source, and the pedestal magnetic pole piece, which is the leakage destination. As a result, the magnetic leakage field can be reduced.

With the above process, stepped part 52, which agrees with the edge of the second nonmagnetic film 22, is formed toward the air bearing surface. The edge of stepped part 52 faces the rear end of the upper core 14 and is sharp (can be substantially perpendicular). Therefore, a magnetic charge is likely to concentrate at the edge of stepped part 52. Due to this effect, the magnetic flux, which is rendered surplus by means of reduction by the upper core 14 or partial saturation, is likely to directly flow to the pedestal magnetic pole piece 28 without moving out of the head's air bearing surface (while concentrating on the edge of stepped part 52). This effect results in suppressing the generation of excess magnetic leakage field on the air bearing surface, thereby minimizing the possibility of invoking an erratic operation in which information is written in an adjacent recording track.

In the present embodiment, a generally 0.2 micron thick silicon dioxide 53 is placed beneath the coil 12 in order to provide electrical insulation between the coil 12 and lower core 15, as shown in FIGS. 4A and 4B.

A second embodiment of the present invention will now be described.

In FIGS. 4A, 4B, 6A, and 6B, the film thickness of the second nonmagnetic film 22 is as specified. In the second embodiment, however, the film thickness of the second nonmagnetic film changes as shown in FIG. 1. The film thickness changes shown in FIG. 1 are periodical. The film thickness change period is about 1.5 microns, which coincides with the film thickness of the upper core 14. Since the second nonmagnetic film 22 exists, the underside of the upper core can be periodically undulated (wavy). While the upper core 14 periodically undulates in the direction of the film thickness, a demagnetizing field is generated within the core in a direction parallel to the direction of the track width. Therefore, the easy magnetization direction can be oriented in the direction of the track width. The array of the resulting magnetic domain status is verified by observing it with a laser-based polarization microscope.

When the surface of the upper core 14 is slightly CMP-processed while the upper core 14 is undulated in the direction of the film thickness, periodic film thickness changes can be applied to the interior of the second core. Even when the periodic film thickness changes are applied, a demagnetizing field is generated within the core in a direction parallel to the direction of the track width as is the case with the above undulation in the direction of the film thickness. Therefore, it is verified by the same method as described above that the easy magnetization direction can be oriented in the direction of the track width.

The information derived from the above magnetic domain observation has confirmed that effectiveness is good when the above periodic film thickness changes or undulations substantially agree with the film thickness of the upper core 14, and that effectiveness is not good when the period is excessively short or long.

Figure 5:
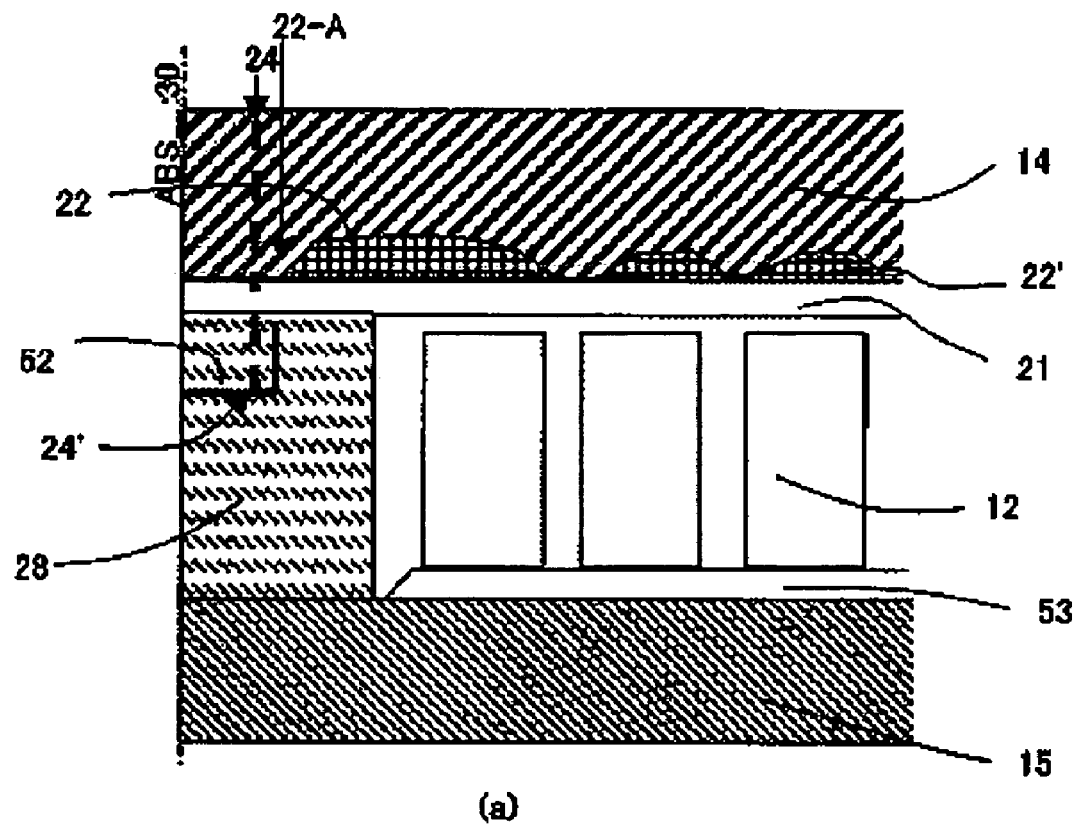
FIGS. 5A and 5B are cross-sectional views of a magnetic head according to a second embodiment of the present invention.
Figure 5:
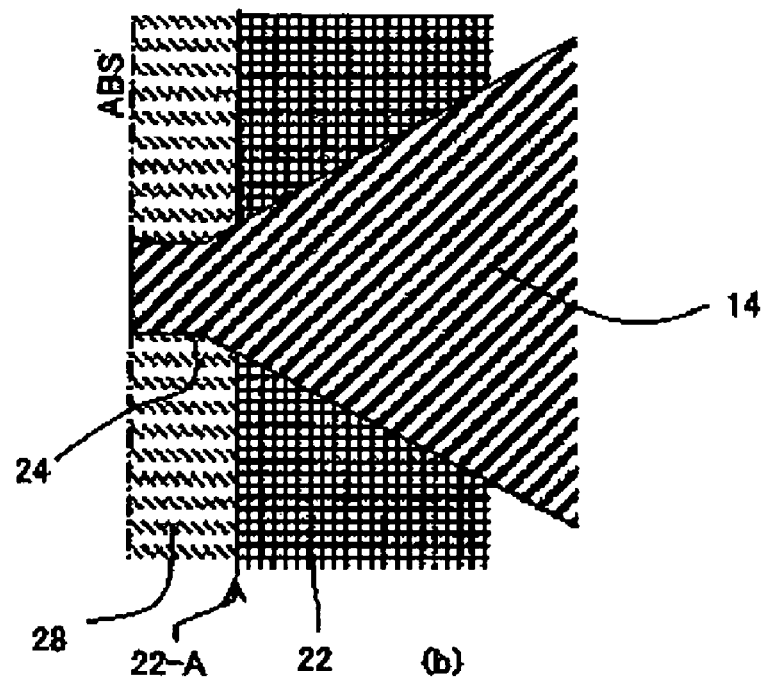

FIG. 5A is a cross-sectional view of a write head according to the present invention (FIG. 5B is a plan view). As shown in the figures, the underside of the second core can be undulated by providing the second nonmagnetic film 22 and nonmagnetic film 22', which is isolated from the top of the pedestal magnetic pole piece, and rendering nonmagnetic film 22' periodic. Nonmagnetic film 22' need not be made of the same material as the nonmagnetic film 22 that is above the pedestal magnetic pole piece. However, if they are made of the same material, the process time requirements are reduced.

The top of the upper core 14 shown in the same figures as mentioned above is flat. It is flat on the presumption that a CMP process has been performed. Therefore, periodic film thickness changes occur on the upper core 14. If the CMP process is not performed, the surface of the upper core is left undulated so that there are periodic undulating changes.

Either of the above configurations is one embodiment of the present invention. Due to a demagnetizing action invoked by periodic changes in the core film thickness or undulation, the magnetic domains generated for the core can be oriented in a direction parallel to the direction of the track width.

When the aforementioned head configuration is employed and a generally 0.3 µm thick CoFe film (2.4 T) is placed below the upper core 14 with a generally 1.5 µm thick 46NiFe layer (1.7 T) placed above the upper core 14 to provide a write gap of about 80 nm, a magnetic field strength of approximately 9 KOe is obtained under conditions where the track width is about 0.15 µm and the flying height is about 15 nm. The electrical current conditions applied in this instance are 6 coil turns and 20 mA. Since the magnetic domain status of the upper core 14 is improved, it is clear that a target magnetic field can be generated at a very low magnetomotive force.

It is evident that the advantage of the capability for generating a target magnetic field at a small write current also lowers the power consumption, lessens the adverse effect on an adjacent track by reducing the magnetic leakage field, and reduces the amount of heat release, which depends on the amount of electromagnetic-conversion-induced loss.

Figure 7:
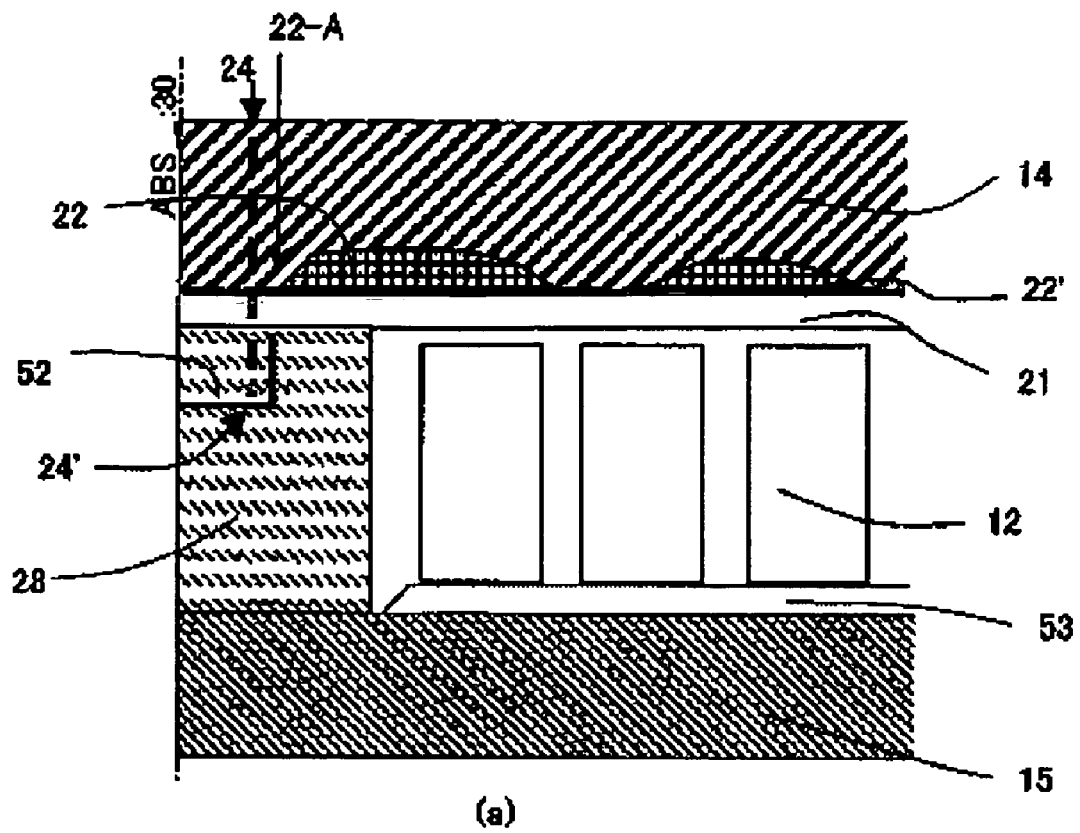
FIGS. 7A and 7B are cross-sectional views of a magnetic head according to a modified version of the second embodiment of the present invention.
Figure 7:
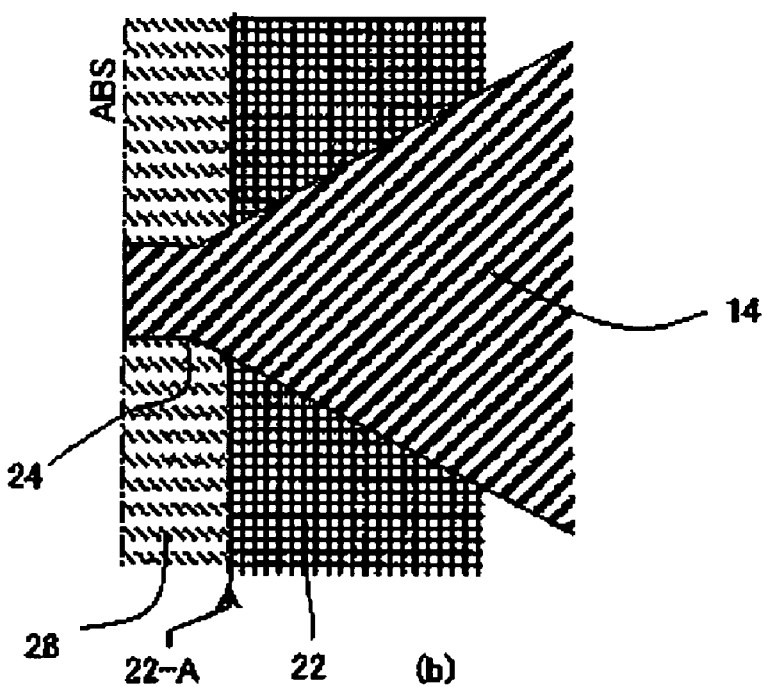

In the example shown in FIGS. 5A and 5B, nonmagnetic film 22' periodically changes its film thickness. However, this periodicity is not essential. Even when film thickness changes irrelevant to the coil periodicity are provided by nonmagnetic film 22' as shown in FIGS. 7A and 7B, the advantages provided by the present invention remain unchanged.

Further, when an underlying layer (initial layer existing at the time of film formation) for the upper core member 14 is selected, the present embodiments can be implemented without using nonmagnetic film 22'.

As the underlying layer, a Cr, Ni, Co, Fe, or other metal film that can control the crystal structure of a magnetic film composing the upper core member 14, or a polymer resin, silicon dioxide, alumina, or other insulation film that can adjust the membrane stress, may be used.

The foregoing description of the present embodiment assumes that the second nonmagnetic film 22 and nonmagnetic film 22' (including both periodic and nonperiodic portions) are formed on the first nonmagnetic film 21. However, the same advantages are obtained even when the first nonmagnetic film is positioned above the other films.

The present embodiment employs a configuration in which the flare point 24 is positioned before the second nonmagnetic film 14. As a result, it is confirmed that the track width variation is not greater than about 30 μm. Further, even when the magnetomotive force is high (a large write current is used), the amount of magnetic field leakage from the upper core member (recording track) is small (erratic operations, which erase the information from adjacent tracks, lowering the recorded information quality, are rarely performed). Since the track width variation is small as described above, it is confirmed that the overwrite performance difference between the heads, which is an index for recorded magnetic field quality evaluation, is not greater than about ±2 dB.

Embodiments of the present invention can be applied to a recording write head for a magnetic disk drive. It provides a core section structure that prescribes the track width with high precision. When a high-density magnetic disk is written onto, embodiments of the present invention also minimize the possibility of invoking an erratic operation in which information in an adjacent track is erased.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head provided with a write head having a lower core, an upper core, and a coil conductor disposed between said lower core and said upper core, the magnetic head comprising:

a pedestal magnetic pole piece formed on said lower core; and a first nonmagnetic film formed between said pedestal magnetic pole piece and said upper core;

a second nonmagnetic film formed above said first nonmagnetic film and below said upper core;

wherein said pedestal magnetic pole piece has a protrusion at a position corresponding to a flare point of said upper core, the corresponding position being disposed between an air bearing surface position and an edge position of said nonmagnetic film; and wherein the protrusion of said pedestal magnetic pole piece has a front end, which is formed closer to the air bearing surface and further away from the edge of said second nonmagnetic film, and a rear end, which is formed under said second nonmagnetic film, and wherein said front end is at a position corresponding to a flare point of said upper core, and said rear end has a stepped part corresponding with the edge position of said second nonmagnetic film;

wherein said upper core is in contact with the first nonmagnetic film composing a write gap on the air bearing surface side, and is placed over the second nonmagnetic film;

wherein said second nonmagnetic film has a thickness of about 0.1 to 0.3 μm.

2. The magnetic head according to claim 1, wherein the protrusion of said pedestal magnetic pole piece has a front end, which is formed toward the air bearing surface rather than the edge of said second nonmagnetic film, and wherein said front end is wider in the direction of a track at the edge position of said second nonmagnetic film than on the air bearing surface position.

3. The magnetic head according to claim 1, wherein the front end surface of said pedestal magnetic pole piece is flat.

4. The magnetic head according to claim 1, wherein the rear end surface of said pedestal magnetic pole piece is flat.

5. The magnetic head according to claim 1, wherein said pedestal magnetic pole piece comprises an alloy film that is mainly composed of Co and Fe.

6. The magnetic head according to claim 1, wherein film thickness changes are provided at multiple locations within an area rearward of said edge position of said upper core as viewed in the direction away from the air bearing surface.

7. The magnetic head according to claim 1, wherein an underlying member is formed beneath said upper core, and wherein film thickness changes are provided at multiple locations within an area rearward of said edge position of said underlying member as viewed in the direction away from the air bearing surface.

8. The magnetic head according to claim 1, wherein film thickness changes are provided at multiple locations within an area rearward of said edge position of said second nonmagnetic film as viewed in the direction away from the air bearing surface.

9. A magnetic head provided with a write head having a lower core, an upper core, and a coil conductor disposed between said lower core and said upper core, the magnetic head comprising:

a pedestal magnetic pole piece formed on said lower core;

a first nonmagnetic film formed between said pedestal magnetic pole piece and said upper core; and a second nonmagnetic film formed between said pedestal magnetic pole piece and the first nonmagnetic film;

wherein said pedestal magnetic pole piece has a protrusion at a position corresponding to a flare point of said upper core, the corresponding position being disposed between an air bearing surface position and an edge position of the second nonmagnetic film; and wherein the protrusion of said pedestal magnetic pole piece has a front end, which is formed closer to the air bearing surface and further away from the edge of the second nonmagnetic film, and a rear end, which is formed under the second nonmagnetic film, and wherein said front end is at a position corresponding to the flare point of said upper core, and said rear end has a stepped part corresponding with the edge position of the second nonmagnetic film;

wherein said upper core is in contact with the first nonmagnetic film composing a write gap on the air bearing surface side, and is placed over the second nonmagnetic film;

wherein the second nonmagnetic film has a thickness of about 0.1 to 0.3 μm.

10. The magnetic head according to claim 9, wherein the protrusion of said pedestal magnetic pole piece has a front end, which is formed toward the air bearing surface rather than the edge of the second nonmagnetic film, and wherein said front end is wider in the direction of a track at the edge position of the second nonmagnetic film than on the air bearing surface position.

11. The magnetic head according to claim 9, wherein the front end surface of said pedestal magnetic pole piece is flat.

12. The magnetic head according to claim 9, wherein the rear end surface of said pedestal magnetic pole piece is flat.

13. The magnetic head according to claim 9, wherein said pedestal magnetic pole piece comprises an alloy film that is mainly composed of Co and Fe.

14. The magnetic head according to claim 9, wherein film thickness changes are provided at multiple locations within an area rearward of said edge position of said upper core as viewed in the direction away from the air bearing surface.

15. The magnetic head according to claim 9, wherein an underlying member is formed beneath said upper core, and wherein film thickness changes are provided at multiple locations within an area rearward of said edge position of said underlying member as viewed in the direction away from the air bearing surface.

16. The magnetic head according to claim 9, wherein film thickness changes are provided at multiple locations within an area rearward of said edge position of the second nonmagnetic film as viewed in the direction away from the air bearing surface.

17. A magnetic head provided a write head having a lower core, an upper core, and a coil conductor disposed between said lower core and said upper core, the magnetic head comprising:

a pedestal magnetic pole piece formed on said lower core;

a second nonmagnetic film formed between said pedestal magnetic pole piece and said upper core;

a first nonmagnetic film formed between said pedestal magnetic pole piece and the second nonmagnetic film;

wherein said pedestal magnetic pole piece has a protrusion at a position corresponding to a flare point of said upper core, the corresponding position being disposed between an air bearing surface position and an edge position of the second nonmagnetic film; and wherein the protrusion of said pedestal magnetic pole piece has a front end, which is formed closer to the air bearing surface and further away from the edge of the second nonmagnetic film, and a rear end, which is formed under the second nonmagnetic film, and wherein said front end is at a position corresponding to the flare point of said upper core, and said rear end has a stepped part corresponding with the edge position of the second nonmagnetic film wherein said upper core is in contact with the first nonmagnetic film composing a write gap on the air bearing surface side, and is placed over a film stack comprising the first nonmagnetic film and the second nonmagnetic film;

wherein the second nonmagnetic film has a thickness of about 0.1 to 0.3 μm.

18. The magnetic head according to claim 17, wherein the protrusion of said pedestal magnetic pole piece has a front end, which is formed toward the air bearing surface rather than the edge of the second nonmagnetic film, and wherein said front end is wider in the direction of a track at the edge position of the second nonmagnetic film than on the air bearing surface position.

19. The magnetic head according to claim 17, wherein the front end surface of said pedestal magnetic pole piece is flat.

20. The magnetic head according to claim 17, wherein the rear end surface of said pedestal magnetic pole piece is flat.

21. The magnetic head according to claim 17, wherein said pedestal magnetic pole piece comprises an alloy film that is mainly composed of Co and Fe.

22. The magnetic head according to claim 17, wherein film thickness changes are provided at multiple locations within an area rearward of said edge position of said upper core as viewed in the direction away from the air bearing surface.

23. The magnetic head according to claim 17, wherein an underlying member is formed beneath said upper core, and wherein film thickness changes are provided at multiple locations within an area rearward of said edge position of said underlying member as viewed in the direction away from the air bearing surface.

24. The magnetic head according to claim 17, wherein film thickness changes are provided at multiple locations within an area rearward of said edge position of the second nonmagnetic film as viewed in the direction away from the air bearing surface.

* * * * *